(12) United States Patent
Shih et al.

(10) Patent No.: US 12,203,748 B2
(45) Date of Patent: Jan. 21, 2025

(54) TAPE REEL POST

(71) Applicant: Stanley Black & Decker, Inc., New Britain, CT (US)

(72) Inventors: Yi-Chan Shih, Taichung (TW); Kuan Chieh Wang, Taichung (TW); Mei-Chun Chang, Taichung (TW)

(73) Assignee: Stanley Black & Decker, Inc., New Britain, CT (US)

( * ) Notice: Subject to any disclaimer, the term of this patent is extended or adjusted under 35 U.S.C. 154(b) by 0 days.

(21) Appl. No.: 18/723,172

(22) PCT Filed: Dec. 22, 2022

(86) PCT No.: PCT/US2022/053834
§ 371 (c)(1),
(2) Date: Jun. 21, 2024

(87) PCT Pub. No.: WO2023/122285
PCT Pub. Date: Jun. 29, 2023

(65) Prior Publication Data
US 2024/0418492 A1    Dec. 19, 2024

Related U.S. Application Data

(60) Provisional application No. 63/293,385, filed on Dec. 23, 2021.

(51) Int. Cl.
*G01B 3/10* (2020.01)
*G01B 3/1003* (2020.01)
(Continued)

(52) U.S. Cl.
CPC ......... *G01B 3/1043* (2020.01); *G01B 3/1003* (2020.01); *G01B 3/1005* (2013.01); *G01B 2003/103* (2013.01); *G01B 2003/1058* (2013.01)

(58) Field of Classification Search
CPC .. G01B 3/1043; G01B 3/1003; G01B 3/1005; G01B 2003/103; G01B 2003/1058
See application file for complete search history.

(56) References Cited

U.S. PATENT DOCUMENTS 3,289,969 A    12/1966  Purbaugh
3,426,435 A    2/1969   Ballard et al.
(Continued)

FOREIGN PATENT DOCUMENTS

CN    208688350 U    4/2019
GB    2369103 B      6/2004
(Continued)

OTHER PUBLICATIONS

Written Opinion, dated Mar. 27, 2023, in corresponding PCT application No. PCT/US2022/053834.

*Primary Examiner* — Yaritza Guadalupe-McCall
(74) *Attorney, Agent, or Firm* — Gabriel A. Haboubi (57) ABSTRACT

A tape measure includes a housing having an interior surface with a post mount protruding therefrom, and a post having a shaft extending from a keyed shape. The post and the post mount are configured such that the post is slid laterally along the interior surface until the post mount is received in the keyed shape. The keyed shape is configured to prevent rotation of the shaft relative to the housing once the keyed shape is received in the post mount.

12 Claims, 6 Drawing Sheets

(51) Int. Cl.
    *G01B 3/1005*     (2020.01)
    *G01B 3/1043*     (2020.01)

(56) References Cited

U.S. PATENT DOCUMENTS

| | | | |
|---|---|---|---|
| 4,067,513 | A | 1/1978 | Rutty et al. |
| 4,487,379 | A | 12/1984 | Drechsler et al. |
| 4,555,854 | A | 12/1985 | Kuntze |
| 6,098,299 | A | 8/2000 | Collins et al. |
| 6,276,071 | B1 | 8/2001 | Khachatoorian |
| 6,718,649 | B1 * | 4/2004 | Critelli ................ G01B 3/1041 242/379 |
| 6,766,588 | B1 | 7/2004 | Hsu |
| 6,811,109 | B1 | 11/2004 | Blackman et al. |
| 7,458,537 | B2 * | 12/2008 | Critelli ................ G01B 3/1005 242/376 |
| 11,022,417 | B2 | 6/2021 | McKinster |
| 11,231,261 | B2 * | 1/2022 | Khangar ............... G01B 3/1041 |
| 11,391,555 | B2 * | 7/2022 | Kang ................... G01B 3/1043 |
| 11,821,727 | B2 * | 11/2023 | Khangar ............... G01B 3/1005 |
| 11,920,925 | B2 * | 3/2024 | Baxter ................ G01B 3/1043 |
| 2008/0184581 | A1 | 8/2008 | Huang |
| 2019/0170491 | A1 | 6/2019 | Khangar et al. |
| 2020/0033108 | A1 | 1/2020 | Vitas |
| 2021/0247170 | A1 | 8/2021 | McKinster |
| 2022/0163308 | A1 * | 5/2022 | Baxter ................ G01B 3/1056 |
| 2024/0053130 | A1 * | 2/2024 | Khangar ............... G01B 3/1056 |

FOREIGN PATENT DOCUMENTS

| | | | |
|---|---|---|---|
| WO | 2018175461 | A1 | 9/2018 |
| WO | 2020023528 | A1 | 1/2020 |
| WO | 2020210459 | A1 | 10/2020 |

* cited by examiner

FIG. 1 (Conventional)

TAPE REEL POST

CROSS-REFERENCE TO RELATED APPLICATIONS

This application is a national stage filing under 35 U.S.C. § 371 of International Application PCT/US2022/053834 filed on Dec. 22, 2022, which claims the benefit of U.S. Provisional Application No. 63/293,385 filed on Dec. 23, 2021, the entire contents of each of which are hereby incorporated herein by reference.

FIELD OF THE INVENTION

The present invention relates to tape measures of the type comprising a housing containing a coiled elongate flexible measuring tape which is extendable from, and automatically retractable back into, the housing. An aspect of this invention may comprise a tape measure that includes a blade that is retractable and extendable relative to an opening in a housing of the tape measure. In particular, the disclosure herein is directed to assembly of such tape measures, and a post around which the tape blade (or a spring motor for the tape measure) rotates during such extension or retraction.

BACKGROUND

Figure 1:
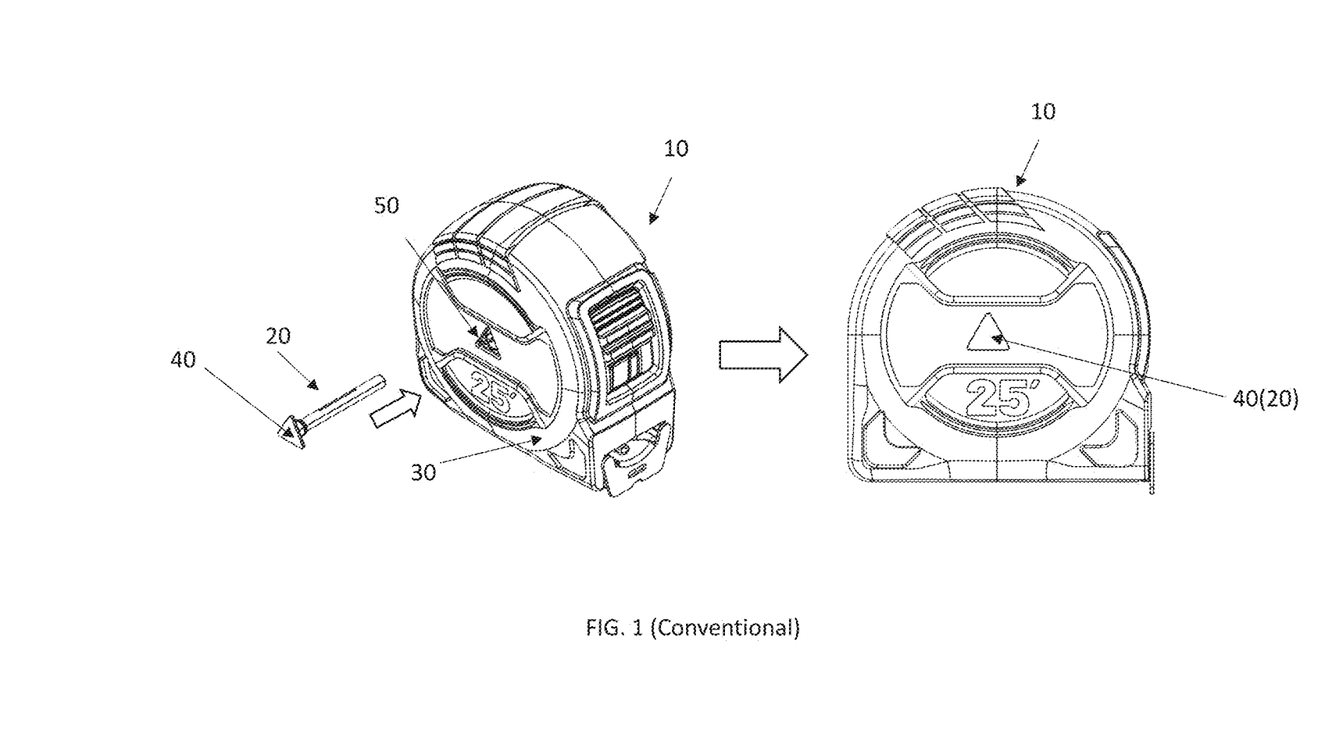
FIG. 1 illustrates a perspective view and side view of assembly of a conventional tape measure, with a reel post is inserted through an exterior surface of the housing.

In some conventional tape measures, such as tape measure 10 shown in FIG. 1, a post 20 is installed from an exterior of the housing 30 of the tape measure 10. Such posts 20 may be formed of metal in some embodiments, such as zinc. The post 20 may have a keyed shape 40 at an end thereof to fit into a post mount 50 in the housing 30, so that the post 20 does not itself rotate relative to the housing. In some such embodiments of conventional tape measures 10, branding and marketing indicia may be applied as stickers, overmolds (e.g., overmolded plastic), cover plates, or other appliques that cover the keyed shape 40 for aesthetic reasons, or for any other reason.

The present disclosure improves upon such post configurations by permitting use of such metal or similarly rigidly made posts, without being exposed from an exterior of the tape measure housing. By having such space on the exterior of the tape measure housing, pad printing processes or other similar process requiring a uniform exterior surface may be utilized for marketing indicia, for example.

SUMMARY OF THE INVENTION

According to one aspect of this disclosure, a tape measure includes a housing having an interior surface with a post mount protruding therefrom, and a post having a shaft extending from a keyed shape. The post and the post mount are configured such that the post is slid laterally along the interior surface until the post mount is received in the keyed shape. The keyed shape is configured to prevent rotation of the shaft relative to the housing once the keyed shape is received in the post mount.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only, and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

Features of tape measures in accordance with one or more embodiments are shown in the drawings, in which like reference numerals designate like elements. The drawings form part of this original disclosure in which.

DETAILED DESCRIPTION OF THE ILLUSTRATED EMBODIMENT(S)

Among other things, the present disclosure improves upon conventional post configurations by permitting use of such metal or similarly rigidly made posts, without being exposed from an exterior of the tape measure housing. By having such space on the exterior of the tape measure housing, pad printing processes or other similar process requiring a uniform exterior surface may be utilized for marketing indicia, for example. Similarly, a more intricate molded exterior surface may be utilized alongside such posts.

Figure 2:
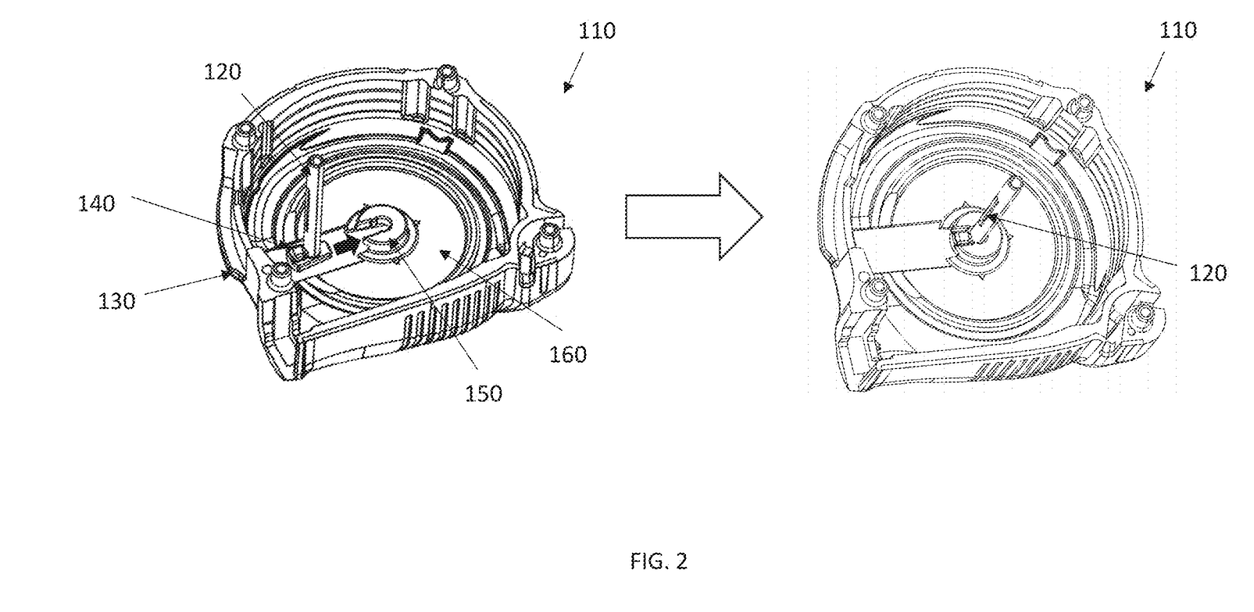
FIG. 2 illustrates a perspective view of assembly of a reel post into a housing of a tape measure of the present disclosure, into an interior slot of the housing.
Figures 3A, 3B, 3C:
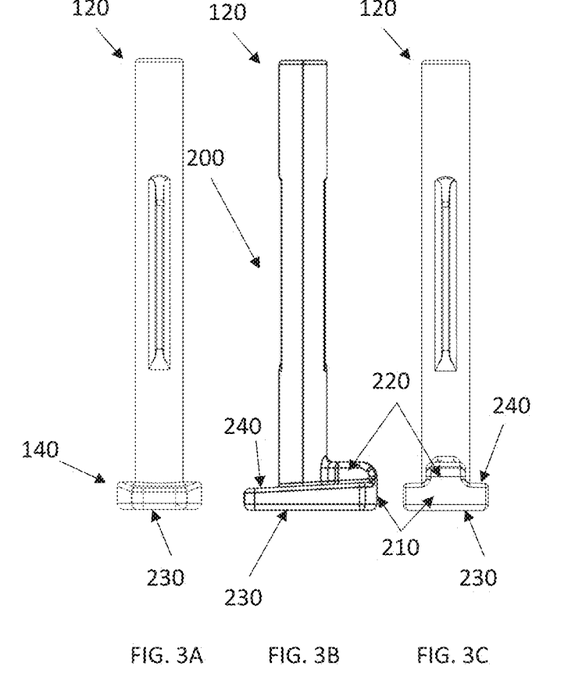
FIGS. 3A-3D illustrates an enlarged front, side, rear, and top views of the reel post of FIG. 2.
Figure 3D:
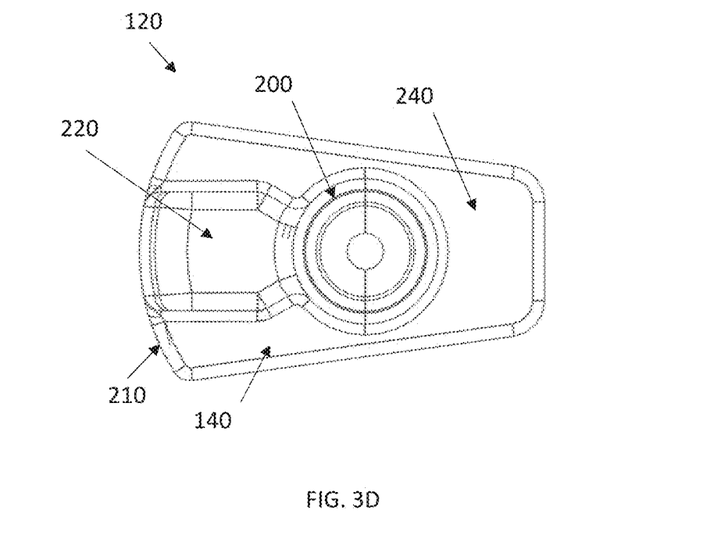
Figure 3E:
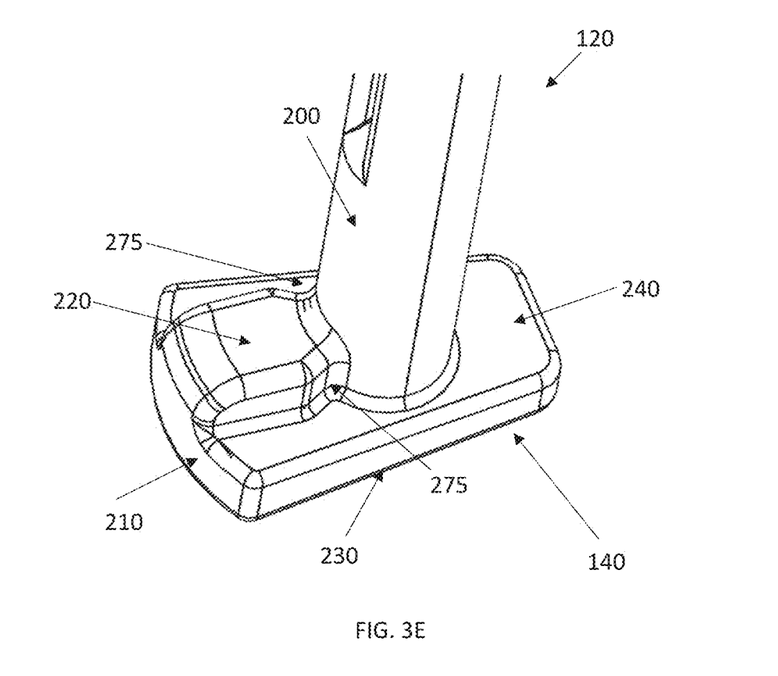
FIG. 3E illustrates an enlarged perspective view of an engagement region of the reel post of FIG. 2.
Figure 4:
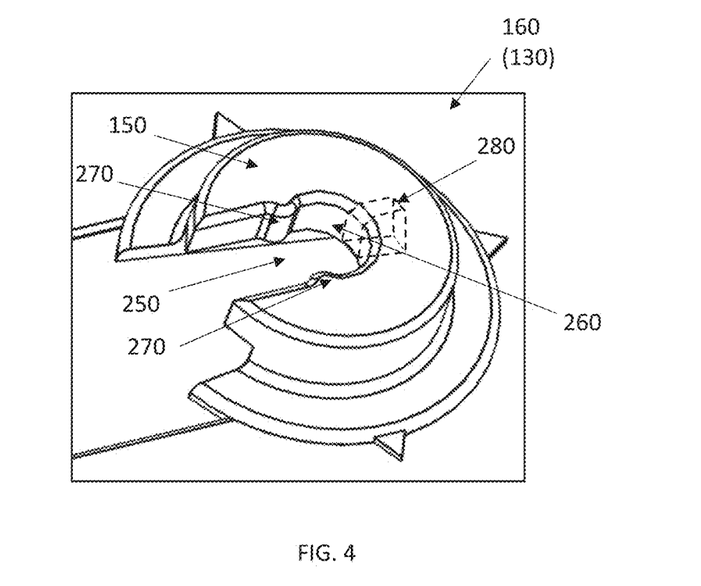
FIG. 4 illustrates an enlarged perspective view of the interior slot of the housing of FIG. 2.

As such, according to an aspect of the disclosure, and as shown in FIG. 2, a tape measure 110 may be configured to receive a post 120 into an interior of a housing 130 of the tape measure 110. Such posts 120 may have a keyed shape 140 at an end thereof, but may be configured to be slid laterally into a post mount 150 formed at an interior surface 160 of the housing 130.

Embodiments of the engagement of the keyed shape 140 of the post 120 and the post mount 150 accessible within the interior surface 160 of the housing 130 is shown in greater detail in FIGS. 3-7.

As shown in the views of FIG. 3A-E, the post 120 may have a shaft 200 extending from the keyed shape 140. The keyed shape 140 may have a non-circular shape, preventing rotation. Such keyed shape 140 may be regular or irregular in various embodiments. In an embodiment, such as that illustrated, the keyed shape 140 may be generally wedge shaped when viewed into the shaft 200, thus permitting ease of insertion into the post mount 150, such as that shown in FIG. 4. As further described below, the keyed shape 140 may include a rounded exterior portion 210 (e.g., a circular segment), and may include a key protrusion 220, both of which may provide desirous engagement with the post mount 150. As further shown in FIG. 3B, but as may be appreciated in greater detail with reference to FIG. 7 below, in an embodiment from a side profile, the keyed shape 140 may also have a wedged configuration from a terminal surface 230 towards a shaft-adjacent surface 240 the post 120 (i.e., defining an acute angle therebetween).

Turning again to FIG. 4, details of an embodiment of the post mount 150 may be understood. In an embodiment, the post mount 150 extends from and above the interior surface 160 of the housing 130. The post mount 150 may include a side slot 250 into which the keyed shape 140 may slide into, such that the terminal surface 230 contacts and slides along the interior surface 160 of the housing 130, while the shaft-adjacent surface 240 of the keyed shape 140 contacts the post mount 150 extending above the interior surface 160. The post mount 150 may include a shaft aperture 260 through which the shaft 200 may extend, and may include one or more detents 270 between the side slot 250 and the shaft aperture 260, which may be configured to flex and deform around the shaft 200 as the keyed shape 140 is slid into the slot 250, so that the detents 270 may expand around the shaft 200 and then generally return in position to snap around the shaft 200. In some embodiments, detent receptacles 275 may be formed between the shaft 200 and the key protrusion 220, such that the detents 270 may be received therein when the shaft 200 is received in the shaft aperture 260. In some embodiments, the post mount 150 may include an expansion slot 280 that facilitates such desired temporary expansion of the detents 270 as they expand to accommodate the shaft 200.

Figure 5:
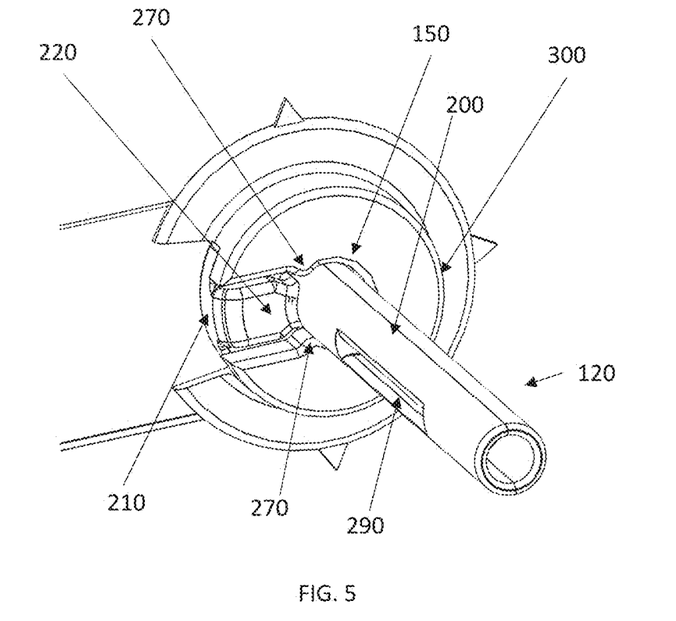
FIG. 5 illustrates an enlarged perspective view of the reel post as inserted into the interior slot of FIG. 2.
Figure 6:
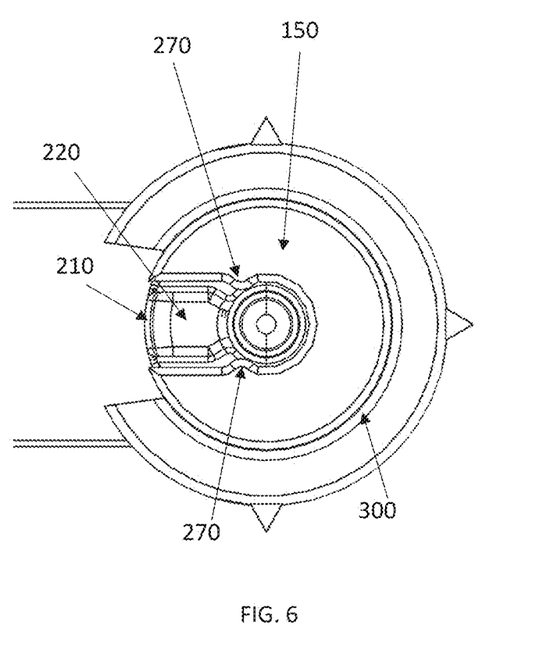
FIG. 6 illustrates an enlarged top view of the of the reel post as inserted into the interior slot of FIG. 2.

As shown in FIGS. 5 and 6, as the post 120 is inserted into the post mount 150, the detents 270 may return in shape and may in some embodiments contact the key protrusion 220 of the post 120. In some embodiments, the key protrusion 220 may be slightly wider in width than the desired position of the detents 270, thus retaining some desired amount of pressure on the detents 270 against the key protrusion 220. Visible in FIG. 5 is a shaft slot 290 that may receive a spring of the tape measure 110, or other aspect coupling a hub around which the tape blade thereof is wound to facilitate automated retraction of the tape blade into the housing 130.

As further shown in FIGS. 5 and 6, the post mount 150 may have a rounded exterior portion 300 that may permit desirous engagement with a hub, reel, or other aspect of the tape measure 110 inside the housing 130 that may rotate about the shaft 200. As shown, in some embodiments the rounded exterior portion 210 of the keyed shape 140 may be configured so that as the shaft 200 is positioned in the shaft aperture 260, the rounded exterior portion 300 of the post mount 150, otherwise interrupted by the side slot 250, may be filled in by the rounded exterior portion 210 of the keyed shape 140 to create a circular configuration of the combined rounded exterior portions 210 and 300.

Figure 7:
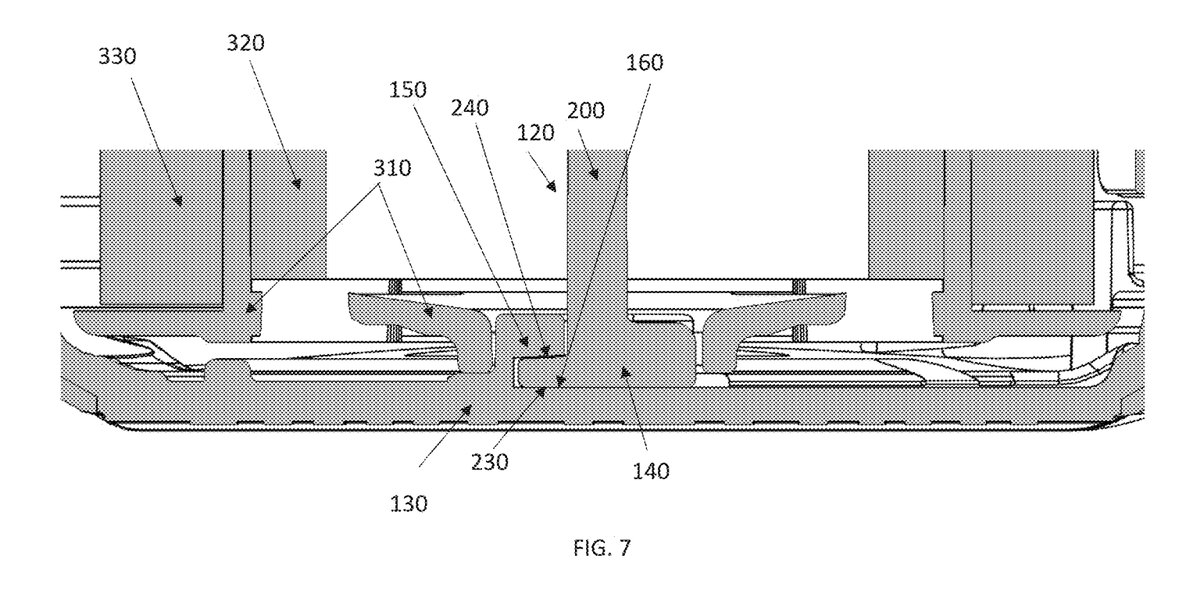
FIG. 7 illustrates a side sectional view of the reel post as inserted into the interior slot of FIG. 2.

The cross-sectional view of FIG. 7 illustrates the assembly of the post 120 as assembled into a housing 130, and more clearly shows the wedged configuration of the keyed shape 140, varying in thickness between the terminal surface 230 that contacts and slides along the interior surface 160 of the housing 130, and the shaft-adjacent surface 240 of the keyed shape 140 that contacts the post mount 150 extending above the interior surface 160. It may be appreciated that such a configuration may further promote holding the post 120 fixed to the housing 130. Further visible in FIG. 7 is an embodiment of how a reel 310 containing a spring 320 and a tape blade 330 may be held against the post mount 150. It may be appreciated that the spring 320 may be coupled to the shaft 200 (e.g., at the shaft slot 290) and to the reel 310 and ultimately coupled to the tape blade 330, so as to permit automated spring retraction of the tape blade 330 when it is extended from the housing 130. Although obscured in the cross-section view of FIG. 7, the detents 270 may be understood to envelop the shaft 200, and may press against the key protrusion 220.

It may be appreciated that one or more of the wedged shape formed by the terminal surface 230 and the shaft-adjacent surface 240, as inserted between the post mount 150 and the interior surface 160, the detents 270, the wedged shape visible in the top down view (e.g., FIG. 3D) or bottom up view of the keyed shape 140, and the key protrusion 220 engaging with the post mount 150 may prevent rotation of the post 120, providing a stable fixed engagement point for the spring 320 to couple to the post 120, and prevent rotation of the post 120 relative to the housing 130. Similarly, it may be appreciated that a circular section shape of the rounded exterior portion 210 of the post 120, and a complementary circular section shape of the rounded exterior portion 300 of the post mount 150, may permit a smooth surface about which the reel 310 may rotate as the tape blade 330 is unwound from the reel 310 to extend from the tape measure 110 or rewound into the reel 310 to retract into the tape measure 110.

It may be appreciated that the post 120 may be formed from a single piece of material. For example, in an embodiment, the post 120 may be formed of metal, such as a cast, stamped, or molded metal, a 3D printed metal, or formed in other such processes. In some such embodiments the post 120 may be formed of zinc. In other embodiments the post 120 may be formed of plastic.

The objects, features, and characteristics of the present invention, as well as the methods of operation and functions of the related elements of structure and the combination of parts and economies of manufacture, may be apparent upon consideration of the description and drawings herein, all of which form a part of this specification. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used herein, the singular form of "a", "an", and "the" include plural referents unless the context clearly dictates otherwise.

In various embodiments, tools and components thereof described herein may be formed of combinations of metal, plastic, ceramic, or any other appropriate material. It may be appreciated that the components described herein may be of different constructions or configurations, including but not limited to one or more being comprised of different material choices. For example, various components described herein may each be constructed from a variety of materials, including but not limited to one or more of fabrics, plastics, metals, rubbers, elastomers, or any other appropriate material choice, such as aluminum (e.g., machined aluminum), iron (e.g., steel), ceramic, or any other appropriate material. In addition to the components disclosed above, portions of tools leveraging the above teachings may be formed from molded or 3D printed plastic, metal, or combinations thereof (e.g., plastic with metal supports or fasteners coupling portions tougher). In some embodiments, structural and functional components may be formed from metal or hard plastic, while exterior-most gripped components positioned to engage the palm of a gripping hand to provide the palm with a comfortable gripping surface may be made of a suitable molded plastic material or elastomeric material, and may be generally formed as a bi-material suitable molded plastic material coated with a layer of an elastomeric material, such as a rubber based material. In some embodiments, the material choices may differ from component to component. In various embodiments, some components may be integrally formed together, while other components may be assembled by any appropriate mechanism, including but not limited to fastened, welded, snap-fit, friction fit, adhesive bonding, or other appropriate securements.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope inventions more specifically understood in the context of the above disclosure.

What is claimed is:

1. A tape measure comprising:
   a housing having an interior surface with a post mount protruding therefrom;
   a post having a shaft extending from a keyed shape;
   wherein the post and the post mount are configured such that the post is slid laterally along the interior surface until the post mount is received in the keyed shape; and
   wherein the keyed shape is configured to prevent rotation of the shaft relative to the housing once the keyed shape is received in the post mount; and
   wherein the shaft comprises an aperture to receive a spring of the tape measure, the spring being configured to bias a reel about which a blade of the tape measure is wound.

2. The tape measure of claim 1, wherein the keyed shape comprises a rounded exterior portion and wherein the post mount comprises a complementary rounded exterior portion, such that when the keyed shape is received in the post mount, the combination forms a generally circular shape.

3. The tape measure of claim 1, wherein the keyed shape comprises a key protrusion configured to be received in a side slot of the post mount.

4. The tape measure of claim 1, wherein a terminal surface of the post and a shaft adjacent surface of the post are acutely angled to one another.

5. The tape measure of claim 1, wherein an exterior portion of the keyed shape is wider than an interior portion of the keyed shape received in the post mount.

6. The tape measure of claim 5, wherein the exterior portion of the keyed shape is rounded.

7. The tape measure of claim 1, wherein the post is formed from one of a cast, stamped, molded or 3D printed metal.

8. The tape measure of claim 1, wherein the post is formed of zinc.

9. The tape measure of claim 1, wherein the post mount comprises detents shaped to envelop the shaft of the post when the post is inserted in the post mount.

10. The tape measure of claim 9, wherein the keyed protrusion comprises receptacles for the detents.

11. The tape measure of claim 1, wherein the post mount comprises an expansion slot configured to facilitate deformation of the post mount as the post is inserted in the post mount.

12. A tape measure comprising:
    a housing having an interior surface with a post mount protruding therefrom;
    a post having a shaft extending from a keyed shape;
    wherein the post and the post mount are configured such that the post is slid laterally along the interior surface until the post mount is received in the keyed shape;
    wherein the keyed shape is configured to prevent rotation of the shaft relative to the housing once the keyed shape is received in the post mount; and
    wherein the keyed shape comprises a rounded exterior portion and wherein the post mount comprises a complementary rounded exterior portion, such that when the keyed shape is received in the post mount, the combination forms a generally circular shape;
    further comprising a reel around which a tape blade is wound; wherein the reel rotates about the generally circular shape.

* * * * *